July 30, 1968 F. J. CLEMENT 3,395,255
LOUDSPEAKING TELEPHONE
Filed July 1, 1964
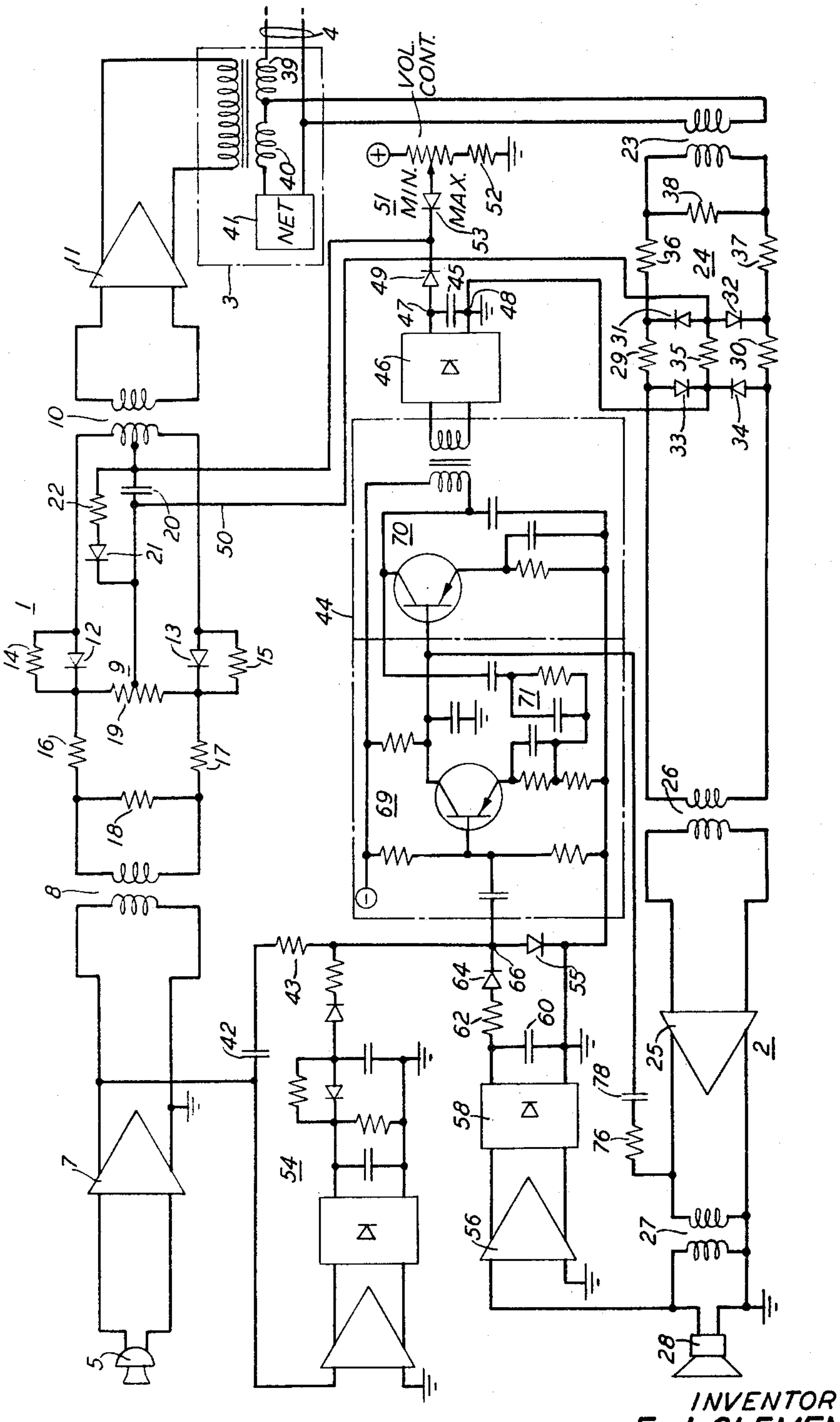
INVENTOR
F. J. CLEMENT
BY Edwin B. Cave
ATTORNEY 3,395,255
LOUDSPEAKING TELEPHONE Frank J. Clement, Matawan, N.J., assignor to Bell Telephone Laboratories, Incorporated, New York, N.Y., a corporation of New York Filed July 1, 1964, Ser. No. 379,455
7 Claims. (Cl. 179—81)

ABSTRACT OF THE DISCLOSURE

In a loudspeaking telephone an RC network feeds the receiver channel output energy back to an amplifier in a voice-controlled channel-switching circuit at a level below that required to switch channels but sufficient to decrease the receiver channel gain in response to increased output volume. A threshold device in the switching circuit prevents the switching circuit from being effective until its output voltage exceeds a manually set control voltage. Thus, the feedback connection is effective only when the receiver output exceeds the manually set normal volume.

This invention relates to loudspeaking telephone sets, and particularly to automatic volume controls for voice-switched loudspeaking telephone sets, often called speakerphones, such as the type disclosed in U.S. Patent No. 3,171,901, issued Mar. 2, 1965, to W. F. Clemency and W. D. Goodale, Jr.

Such sets comprise a transmitting channel that transfers the audible message of a local subscriber to a telephone line connecting the set to remote subscribers, and a receiving channel that transfers the audible message of a remote subscriber from the telephone line to the local subscriber. A control circuit establishes a quiescent operating mode, for example, the receiving mode of operation, by producing a bias voltage that normally suppresses the gain of the transmitting channel while expanding the gain of the receiving channel. In response to voice energy appearing in the suppressed, i.e., transmitting channel, the control circuit bias changes and reverses the gains of the channels over a wide enough range, such as 36 db, to switch from the receiving mode to the transmitting mode of operation.

In the before-mentioned application of Clemency and Goodale, a receiver volume control in subtractive relation with the bias voltage forms a threshold which the bias must exceed. In the receiving mode, the volume control inversely varies the channel gain enough to permit gain control of the receiver channel but not enough to switch the operating modes.

One of the difficulties encountered in such a system is in using the volume control. A listening subscriber may manually increase the gain of the receiving channel to obtain normal output volume in response to weak signals, and after the conversation may leave the set at high volume. Subsequent normal signals, such as a telephone dial tone, may then come out at extraordinary high volume, such to the annoyance of the subscriber.

This difficulty normally can be overcome with automatic volume control (AVC) systems which feed energy from the output of a receiver amplifier back to its input. However, such systems have the disadvantage of compressing the incoming signals, thereby distorting and decreasing the quality of the output signals.

So-called "delayed" AVC systems compress only the signals whose output energy exceeds a predetermined amplitude. However, the inclusion of such additional systems in a speakerphone would have the effect of adding considerable bulk and cost to a telephone device which should be inexpensive, small, and simple.

An object of the present invention is to impart the advantages of an AVC system for a speakerphone while adding substantially no bulk, cost, or complexity to present speakerphone systems. Another, more general, object of this invention is to improve speakerphones.

A more specific object of the invention is to provide a delayed AVC system for speakerphone, adding substantially no bulk or complexity thereto, and particularly one which will encourage the operator to set the volume control at a level below the compression level of the delayed AVC so as to receive mainly undistorted signals despite the necessity of requiring high volume settings for weak signals.

According to a feature of this invention, a delayed AVC is obtained for a speakerphone system having a volume control voltage or other voltage in subtractive relation with the output of a channel-switching circuit, by feeding the receiving channel output energy back to the channel-switching circuit in a sense that reduces the receiver gain in response to increases in the receiving-channel output energy. The invention is based on the recognition that despite its main function of responding to the transmitting channel, the control circuit has such a wide channel-switching bias-voltage range, it can also respond to the receiving channel for producing intermediate bias voltages that cause no channel switching. The invention is also based on the further recognition that the subtractive threshold voltage established by the volume control relative to the switching control circuit can also function as a threshold in an AVC feedback path to the receiving channel without adversely affecting its response either to the receiver output or to the energy in the transmitter channel. Thus, the invention achieves "delayed" AVC utilizing existing circuitry and only a few, often as few as two, extra components.

These features and others are pointed out particularly in the claims. Other objects and advantages of the invention will be mentioned or will become obvious from the following detailed description of a speakerphone embodying features of the invention and illustrated in the accompanying drawing showing a schematic diagram of a speakerphone.

In the drawing a loudspeaking telephone set comprises a transmitting channel 1 and a receiving channel 2, both connected to a hybrid network 3 that electrically couples signals to a telephone line 4. In the transmitting channel 1, a microphone 5 transduces the audible message from a local subscriber to electrical energy and passes it to the hybrid circuit 3 through an audio amplifier 7, a coupling transformer 8, a balanced and current-controlled variable impedance device 9, a coupling transformer 10, and an amplifier 11, cascade-connected in the order recited. The variable impedance device 9, often called a variolosser, includes a pair of semiconductor diodes 12 and 13 connected in series in the channel conductors and respective diode-shunting resistors 14 and 15. Diodes 12 and 13 when carrying no direct current exhibit high impedance to alternating energy flowing from the microphone 5. Thus, these series-connected devices suppress the gain of the transmitting channel in their normal state. However, they lower their impedance to alternating energy in response to direct-current biasing applied thereto. This direct-current biasing increases the channel gain. Situated between the secondary winding of transformer 8 and the cathode electrodes of diodes 12 and 13 is an attenuating resistance pad comprising resistors 16 and 17 in series with the respective channel conductors and resistors 18 and 19 bridging the channel conductors on either side of resistors 16 and 17. The before-mentioned direct-current biasing is applied across a decoupling capacitor 20. The latter is shunted by a bias-current-bleeding circuit composed of serially connected semiconductor diode 21 and resistor 22, which circuit connects the center tap on the resistor 19 to the center tap on the primary coil of transformer 10.

A transformer 23 couples the hybrid transformer 3 to the receiving channel 2. Here, a current-controlled variable impedance arrangement, or variolosser, 24 regulates the energy applied to an audio amplifier 25 through a transformer 26, and an output transformer 27 applies the amplified energy to a loudspeaker 28. The variable impedance device 24 includes two resistors 29 and 30 in respective channel conductors, two oppositely-poled series-connected diodes 31, 32 and 33, 34 bridging the channel conductors on either side of the resistors 29 and 30. The diodes 31 and 32 form a junction with their anodes while the diodes 33 and 34 form a junction with their cathodes so as to form high shunt impedances across the channel conductors. Thus, these diodes, when unenergized, assure maximum receiver gain. Connecting the diode junctions is a resistor 35. Similar to the diodes 12 and 13, direct current through the semiconductor diodes 31 to 34 serves to lower their resistance to alternating energy. However, this lower resistance in shunt diodes increases the loss in the channel and suppresses the receiver channel gain. An attenuating resistance pad formed of resistors 36, 37, and shunt resistor 38 joins the secondary winding of the transformer 23 with the variolosser 24.

The hybrid circuit 3 is of conventional design having arm coils 39 and 40, telephone line 4, and a network 41. While energy propagating through transmitting channel 1 is transformer coupled to the hybrid circuit across a first pair of diametrically opposite junctions located at the extreme ends of coils 39 and 40, energy propagating through line 4 is coupled to the receiving channel 2 via transformer 23 which has its primary winding connected to the bridge's second pair of diametrically opposed junctions. Network 41 is of a self-balancing variety conventionally used in telephone practice which adjusts its impedance to match that of line 4 in accordance with the magnitude of direct current applied to the terminals.

As stated, the unbiased series diodes 12 and 13 in variolosser 9 suppress the transmitting channel gain, and the unbiased shunt diodes 31, 32, 33, and 34 in variolosser 24 permit maximum receiver channel gain. The relative channel gains can be reversed or otherwise changed by passing a direct current through the variolossers. Such a direct current for channel switching is derived by feeding the audio-frequency energy at the output of amplifier 7 through a coupling capacitor 42 and series resistor 43 to a multi-stage amplifier 44. The capacitor 42-resistor 43 circuit is adapted to pass substantially the entire range of voice signals that have appeared at the output of amplifier 7. The amplifier 44 responding to this voice energy charges a capacitor 45 through a four-diode bridge rectifier having positive and negative output terminals 47 and 48.

The potential developed across a storage capacitor 45 energizes a direct-current conducting path which biases the diodes 12, 13, and 31 through 34. Forming the path is a connection of the positive terminal 47 to the anode of a diode 49, the cathode of which is in turn joined to the center tap of the primary winding of transformer 10. The path continues through the primary winding of transformer 10, through diodes 12 and 13, and down to a center tap of resistor 19. From the center tap of the resistor 19 the path continues through a conductor 50 terminating at the junction of the diodes 31 and 32, through the parallel branches comprised of diodes 31 and 33 and diodes 32 and 34, and is completed by connection of the junction of diodes 33 and 34 to the grounded negative terminal 48.

Opposing the voltage established by the capacitor 45 is the voltage established by a grounded volume control 51 grounded through a resistor 52 and energized at its other end by a positive voltage. It is connected at its slide wire to the diode 49 by a diode 53. Because the cathodes of the diodes 49 and 53 are connected together, only the higher of the two voltages established by the capacitor 45 and the volume control 51 will be effective. The higher voltage will back bias the diode associated with the other voltage and prevent its conduction. Thus, the variolossers 9 and 24 are biased by the higher potential of either the volume control 51 or the potential developed across capacitor 45. The resistor 52 establishes a minimum volume control potential that prevents the variolossers from responding to spurious background conversation at amplifier 7.

A circuit more fully described in U.S. Patent No. 3,171,901, issued Mar. 2, 1965, to W. F. Clemency and W. D. Goodale, Jr., and generally designated 54, distinguishes between the envelopes of syllabic sound and of noise appearing in amplifier 7. If only noise appears, the circuit 54 passes a direct current through a variolosser diode 55 across the input of amplifier 44. This has the effect of shunting the input of amplifier 44 and making it unresponsive to audio-frequency signals. In this manner, background noise in the absence of syllabic speech cannot energize the amplifier 44.

Also for the purpose of suppressing the response of the amplifier 44 is a circuit which senses the input to the speaker 28 so as to prevent operation of amplifier 44 in response to syllabic signals appearing in the microphone 5 as a result of sound at the output of speaker 28. In this circuit, an amplifier 56 senses the energy at the input of speaker 28 and passes it through a rectifier 58. This energizes a storage capacitor 60. The positive ungrounded plate of the capacitor 60 connects through an output terminal comprising resistor 62 and diode 64 poled to conduct direct current away from the capacitor 60. This direct current passes through the diode 55 and lowers its impedance to alternating signals. Diode 55 is substantially similar to those included in variable impedance devices 9 and 24. It has its anode and cathode terminals respectively bridged across the input terminals of amplifier 44 and when passing direct current renders the amplifier 44 substantially unresponsive.

Amplifier 44 is composed of two transistor stages 69 and 70. Although any multiple stage amplifier is adequate, the one shown in the illustrated embodiment exists in many speakerphones without AVC and has proven advantageous for adaptation to AVC. Here, a degenerative feedback circuit 71 from the collector output of the second stage 70 to the emitter of stage 69 stabilizes the magnitude of gain in both of these stages regardless of changes in the transistor characteristics.

Connecting the primary winding of the transformer 27 to the junction joining amplifier stages 69 and 70 is a series RC feedback network composed of an attenuating resistor 76 and an audio-frequency coupling capacitor 78. It is this RC network that constitutes the extra components necessary for converting an ordinary speakerphone to one having a delayed AVC.

Initially, the set resides in its receive mode of operation because the unbiased series diodes 12 and 13 of variable impedance device 9 act as high loss elements to energy propagating in the transmitting channel while shunt diodes 31 through 34 of variable impedance device 24 function as low loss elements to energy coupled to the receiving channel. The loss characterizing each channel to a quiescent period, that is, when no energy is applied to the set, is determined by the slide wire setting of the volume control potentiometer 51. The greater the voltage at the volume control, the greater the biasing current passing through the variolossers 24 and 9. As the slide wire moves toward the potentiometer's positive source, the loss exhibited by the transmitting channel is decreased while the loss exhibited by the receiving channel is increased. As the slide wire moves toward ground, the change in loss exhibited by the channels is reversed. However, throughout the whole range of the volume control the change in losses is insufficient to change the operating mode of the set. Thus, no matter how positive the volume control is set and how great the biasing current in the variolossers due to the volume control, it will be not nearly sufficient to decrease the loss in the transmitting channel and increase the loss in the receiving channel to place the set in the transmitting mode. The slide wire is set in accordance with the gain required to produce a satisfactory level from the loudspeaker. In a noisy environment where relatively high volume is desirable, the slide wire is positioned toward the Max. end of the scale while, on the other hand, when only relatively low receiving channel gain is required, the slide wire is positioned toward the Min. end of the scale. In addition, the volume control allows regulation of the quantity of losses switched between channels when the speakerphone switches mode of operation. The maximum quantity is switched when the slideis in the Max. position, and the minimum quantity when the slide is in the Min. position. This is so because in the Min. position some of the loss possible during switching has already been produced.

When a local subscriber to a call talks into the microphone 5, an alternating current signal representing his speech waves is applied by the coupling circuit comprising capacitor 42 and resistor 43 to amplifier 44 which charges capacitor 45 through rectifier 46. Energy in the microphone 5 will charge the capacitor 45 to a level far exceeding that of the volume control so as to drive direct current through the variolossers 9 and 24. Thus, the loss exhibited by the diodes 12 and 13 to alternating energy is drastically decreased, and the loss to alternating current energy of diodes 31 to 34 is similarly decreased. However, the decrease in loss of diodes 31 to 34 in effect shunts the channel lines of the receiver channel and cuts off the latter. Diode 21 and resistor 22, along with resistor 35, are proportioned to equalize the inverse gain changes in channels 1 and 2.

If the remote subscriber to the call desires to break into the convention, he merely talks into his microphone, or corresponding apparatus if a conventional telephone set is used, and a speech signal is transmitted through line 4 and hybrid transformer 3 to receiving channel 2. During the local subscriber's intersyllabic lulls, the remote subscriber's speech waves are translated by transformer 27 and amplifier 25 and are applied to charge capacitor 60 through amplifier 56 and rectifier 58. The potential developed across capacitor 60 drives unidirectional current through resistor 62 and diodes 64 and 68, thereby lowering the impedance of the latter to alternating energy. With the alternating signal developed across diode 68 consequently reduced, the direct-current energy linking the diodes of variolossers 9 and 24 is similarly reduced, thereby initiating a regenerative process resulting in the set's operating condition being switched from transmitting to receiving mode. The circuit composed of members 62 to 68 as previously mentioned also prevents voice signals picked up by the microphone 5 from the speaker 28 from switching the set from the receive mode to the transmit mode.

In the receive mode of operation, no voltage appears across capacitor 45. The signals from the telephone line 4 pass through the hybrid transformer 3, through the transformer 23, and through the variolosser 24. The latter attenuates the signals to an extent determined by the position of the slide wire on volume control 51. The signals further pass through transformer 26, amplifier 25, transformer 27, and are transduced to audible energy by loudspeaker 28.

According to the invention, the RC circuit composed of resistor 76 and capacitor 78 feeds back the energy at the output of amplifier 25 to the amplifier 44 between the stages 69 and 70. The amplification by stage 70 is less than for signals applied to the input of total amplifier 44. After amplification, the rectifier 46 applies a direct voltage to the capacitor 45. The amplification of stage 70 and resistance of resistor 76 are such that for normal listening volume the charge on capacitor 45 will not exceed the voltage at the slide wire of volume control 51. Thus, at these levels the feedback is initially ineffective for changing the volume. However, if the volume of incoming signals is beyond normal listening value, the charge at capacitor 45 will exceed the volume control setting and increase the loss in variolosser 24 so as to decrease these high volume signals. The fact that the amplification of stage 70 is less than that of amplifier 44 helps assure a receiver feedback that will be insufficient to change the variolosser biases enough to switch channels. Switching only occurs when the amplifier 44 senses the syllabic energy at amplifier 7 and charges the capacitor 45.

The resistor 76, by controlling the amount of energy fed back, affects the threshold at which AVC action is effective. This is so because it determines whether a sufficient amount of energy will be fed back to amplifier 44 to exceed the threshold established by volume control 51. It also affects the degree of AVC compression after the threshold is exceeded. Of course, the degree of compression and threshold is also determined by the gain of amplifier stage 70. However, by selecting a proper resistance value, the inception of AVC during operation may be simply established at a desired level, preferably just above normal listening volume. At this established level, the output volume produced when AVC is effective would be too high for normal listening. A listener would respond to such an output by lowering the volume into the normal listening range. The AVC would then affect only unexpected high volume signals to an unannoying, but higher-than-normal listening level. Thus, the invention provides a speakerphone enjoying all the advantages of undistorted reception prevailing in a normal speakerphone, but relieving the user of annoying loud sounds when the volume has been set high at an earlier time. This is accomplished with the addition of only two simple components.

While a specific embodiment of the invention has been described in detail, it will be obvious to those skilled in the art that the invention may be embodied otherwise within its scope.

What is claimed is:

1. A loudspeaking telephone set comprising transmitting and receiving channels, control means connected to the channels and forming a potential for inversely varying the gains of said channels over a channel switching range and in response to signal energy in one of said channels, voltage means in threshold forming relation with said potential of said control means for modifying the potential, and feedback means coupling the signal at the output portion of said receiving channel to said control means in a polarity tending to decrease the receiver channel gain in response to increases of receiver channel output, and over a range less than the switching range.

2. A loudspeaking telephone set comprising transmitting and receiving channels, channel control means connected to the channels for forming a gain-controlling voltage and inversely varying the gains of said channels over a channel switching range and in response to signal energy in one of said channels, feedback means connecting the output portion of said receiving channel to said channel control means in a polarity tending to decrease the receiver channel gain in response to increases of receiver channel output but over a range less than the channel switching range, and manually operable volume control means having an output voltage in subtractive threshold relation with the gain-controlling voltage in said control means for modifying the gain of said receiving channel.

3. A loudspeaking telephone set comprising transmitting and receiving channels, switching means connected to the channels for inversely varying the gains of said channels over a channel switching range in response to signal energy in one of said channels, volume control means having an output voltage, circuit means including output portions of said switching means and said volume control means for suppressing the lesser output voltage of said switching means and said volume control means, and feedback means connecting the output portion of said receiving channel to said switching means in a polarity tending to decrease the receiver channel gain in response to increases of receiver channel output.

4. A loudspeaking telephone set comprising transmitting and receiving channels, switching means connected to the channels for inversely varying the gains of said channels over a channel switching range and in response to signal energy in one of said channels, a resistor-capacitor circuit coupling the output portion of said receiving channel with the switching means, said switching means having amplifying means responding to said resistor-capacitor circuit for producing a switching means output voltage that tends to decrease receiving channel gain in response to increasing signals in said receiving channel, and volume control means in subtractive threshold forming relation with the voltage of said switching means for allowing said voltage to affect the gain of said receiving channel only when the voltage exceeds a variable preset voltage in said volume control means.

5. A loudspeaking telephone set comprising transmitting and receiving channels, channel control means connected to the channels for inversely varying the gains of said channels over a channel switching range and in response to signal energy in one of said channels, manually operable volume control means having an output voltage, feedback means connecting the output portion of said receiving channel to said channel control means in a polarity tending to decrease the receiver channel gain in response to increases of receiver channel output but over less than the channel switching range, and circuit means including output portions of said channel control means and said volume control means for suppressing the lower of the output voltage of said switching means and said volume control means, said circuit means including in said switching means a diode and including in said volume control means a second diode opposing the first diode, whereby only the greater output voltage of said channel control means and said volume control means is effective for controlling the gains of said channels.

6. A loudspeaking telephone set comprising transmitting and receiving channels, channel control means connected to the channels for inversely varying the gains of said channels over a channel switching range and in response to signal energy in one of said channels, manually operable volume control means having an output voltage, circuit means including output portions of said channel control means and said volume control means for suppressing the lower output voltage of said channel control means and said volume control means, said circuit means including in said channel control means a diode and including in said volume control means a second diode opposing the first diode, whereby only the greater output voltage of said channel control means and said volume control means is effective for controlling the gains of said channels, a series resistor-capacitor circuit coupling the output portion of said receiving channel with the channel control means, said channel control means having amplifying means for producing an output voltage in response to signals in said receiving channel in a polarity tending to decrease the receiver channel gain in response to increases of receiver channel output.

7. A loudspeaking telephone set comprising transmitting and receiving channels, channel control means connected to the channels for inversely varying the gains of said channels over a channel switching range and in response to signal energy in said transmitting channel, manually operable volume control means having an output voltage, circuit means including output portions of said channel control means and said volume control means for suppressing the lower output voltage of said switching means and said volume control means, said circuit means including in said channel control means a diode and including in said volume control means a second diode opposing the first diode, whereby only the greater output voltage of said channel control means and said volume control means is effective for controlling the gains of said channels, a series resistor-capacitor circuit coupling the output portion of said receiving channel with the channel control means, said channel control means having amplifying means for producing an output voltage in response to signals in said receiving channel in a polarity tending to decrease the receiver channel gain in response to increases of receiver channel output.

References Cited

UNITED STATES PATENTS

| | | | |
|---|---|---|---|
| 3,171,901 | 3/1965 | Clemency | 179—81 |
| 3,330,912 | 7/1967 | Koseki | 179—81 |

WILLIAM C. COOPER, *Primary Examiner.*

R. TAYLOR, *Assistant Examiner.*